J. L. STRAUB.
BALL RETAINER.
APPLICATION FILED DEC. 6, 1911.

1,017,480. Patented Feb. 13, 1912.

Witnesses
W. W. Nairn Jr.
R. W. Bishop

Inventor
Jackson L. Straub
By Julian C. Dowell
Attorney

UNITED STATES PATENT OFFICE.

JACKSON L. STRAUB, OF LANCASTER, PENNSYLVANIA, ASSIGNOR TO THE STAR BALL RETAINER COMPANY, OF LANCASTER, PENNSYLVANIA, A CORPORATION OF NEW JERSEY.

BALL-RETAINER.

1,017,480.  Specification of Letters Patent.  Patented Feb. 13, 1912.

Application filed December 6, 1911. Serial No. 664,231.

*To all whom it may concern:*

Be it known that I, JACKSON L. STRAUB, a citizen of the United States of America, residing at Lancaster, in the county of Lancaster and State of Pennsylvania, have invented certain new and useful Improvements in Ball-Retainers, of which the following is a specification.

This invention relates to ball retainers for ball bearings of the type shown in Letters Patent to Henry B. Keiper, No. 686,617, granted November 12, 1901, and has for its object the production of a simple, efficient and inexpensive ball retaining device of the character referred to which shall possess all of the advantages of the Keiper retainer while easier and less expensive to make.

The invention will first be hereinafter more particularly described, with reference to the accompanying drawings, which are to be taken as a part of this specification, and then pointed out in the claims at the end of the description.

Figure 1:
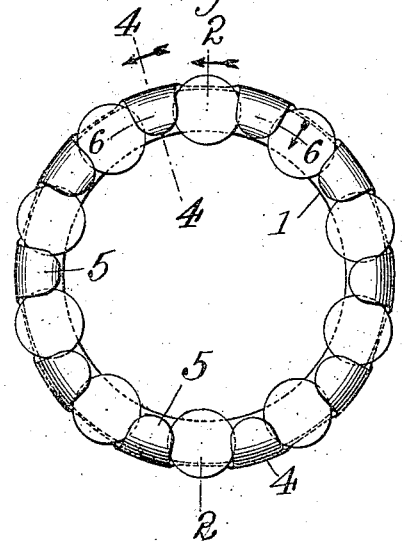
Figure 2:
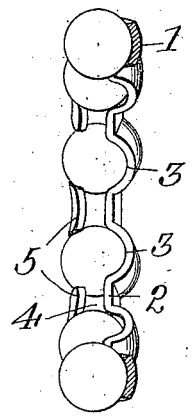
Figure 3:
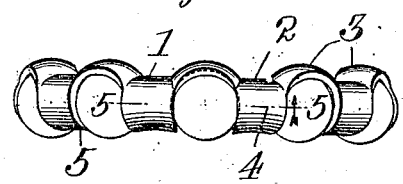
Figure 4:
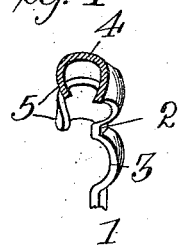
Figure 5:
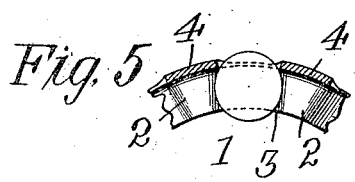
Figure 6:
Figure 7:
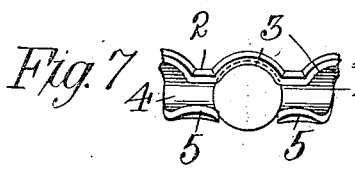
Figure 8:
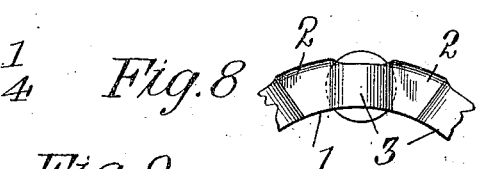
Figure 9:
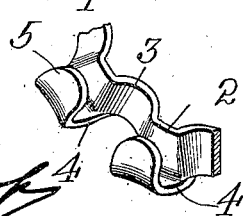

In the drawings, Figure 1 is a plan view of a ball retainer embodying my present invention with the balls in position therein, Fig. 2 is a section on the line 2—2 of Fig. 1, Fig. 3 is an edge view of the retainer with the balls therein, Fig. 4 is a detail section on the line 4—4 of Fig. 1, Fig. 5 is a detail section on the line 5—5 of Fig 3, Fig. 6 is a detail section on the line 6—6 of Fig. 1, Fig. 7 is an inner edge view of a portion of the device, Fig. 8 is a detail plan looking at the side which is hidden in Fig. 1, Fig. 9 is a detail perspective view of a portion of the retainer.

The retainer comprises a ring or annular base portion 1 which is corrugated or formed with alternating ridges 2 and depressions or furrows 3, the furrows being approximately semifunnel shaped so that the surfaces thereof extend transversely and obliquely to the axis of the ring from the outer to the inner edge thereof, the inner ends of the furrows being deeper and narrower than the outer ends of the same. Projections or standards 4, alternating with the furrows, extend from the outer edge or margin of the base substantially parallel with the axis of the ring and have their free ends 5 extended inwardly, so as to overlie or overhang the base, and tapered toward their extremities. The free ends of the standards overlie the ring directly over the ridges, one at each side of a furrow, and are curved toward the ring, as shown most clearly in Fig. 4. The effect of this construction is to increase the length of the standards, or the distance from the tops thereof to their bases, or the bottoms of the depressions or furrows in the corrugated ring, and to bring the standards closer together than they were in the original blank, thereby forming suitable spaces between adjacent standards to receive and confine the balls without preventing free rotation thereof.

The particular formation of the furrows and the standards hereinbefore set forth permits the balls to be snapped into place between the standards and seat in the furrows where they will be held out of contact and secured against displacement so that the retainer and the balls therein may be inserted in or removed from a bearing without loss of any balls or disturbing their relative arrangement. The curved formation of the free ends of the standards causes the standards to effectually retain the balls without projecting beyond the circumference of the ring so that there is no liability of any part of the retainer coming into contact with the race rings, or similar members of the bearing, and creating wear thereon.

Having thus described my invention, what I claim as novel and desire to secure by Letters Patent is:—

1. A ball retainer and separator for ball-bearings consisting of a base-ring with spaced standards extending from the outer edge thereof, the free ends of the standards overhanging the ring, the latter being corrugated, thereby providing ball-seating depressions between the standards, said depressions extending transversely of the axis of the ring and having the effect of increasing the length of the standards and lessening the distance therebetween.

2. A ball retainer and separator for ball bearings consisting of a base-ring with spaced standards extending from its outer edge, the free ends of the standards overhanging the base-ring, the latter being corrugated, thereby providing ball-seating depressions between the standards, said depressions extending transversely of the axis of the ring, and widening toward one edge of the ring and in effect increasing the length of the standards and lessening the distance therebetween.

3. As a new article of manufacture, a ball retainer and separator for ball-bearings consisting of a base-ring with spaced standards rising from its outer edge, the free ends of said standards overhanging the base-ring, the latter being corrugated, thereby providing depressions between the bases of the standards to form alternating ridges and ball-seating furrows which extend transversely of the axis of the ring and lessen the distance between adjacent standards.

4. A ball retainer and separator for ball-bearings consisting of a base-ring with spaced standards extending from the outer edge thereof parallel with the axis of the same, the free ends of the standards overhanging the ring, said base-ring being corrugated, thereby providing depressions between the standards to form furrows having their inner ends deeper and narrower than their outer ends, whereby spaces are provided to receive and retain the balls.

5. A ball retainer and separator for ball-bearings consisting of a base-ring with spaced standards extending from the outer edge thereof, the free ends of the standards overhanging the ring, said ring being corrugated, thereby providing depressions between the standards to form furrows having their ends adjacent the standards wider and shallower than their opposite ends whereby spaces are provided to receive and retain the balls.

6. As a new article of manufacture, a ball retainer and separator for ball-bearings consisting of a base-ring with spaced standards rising from its outer edge, the free ends of said standards overhanging the base-ring and being curved toward the same, the latter being corrugated, thereby providing depressions between the bases of the standards to form alternating ridges and ball-seating furrows which extend transversely of the axis of the ring and lessen the distance between adjacent standards.

In testimony whereof I affix my signature, in presence of two witnesses.

JACKSON L. STRAUB.

Witnesses:
M. A. FURLMER,
A. G. HERTZLER.

---

Copies of this patent may be obtained for five cents each, by addressing the "Commissioner of Patents, Washington, D. C."